United States Patent [19]
Mori

[11] Patent Number: 6,061,146
[45] Date of Patent: *May 9, 2000

[54] FACSIMILE APPARATUS FOR TRANSMITTING A BINARY FILE DATA

[75] Inventor: Yukikazu Mori, Ebina, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/771,233

[22] Filed: Dec. 20, 1996

[30] Foreign Application Priority Data

Dec. 22, 1995 [JP] Japan ................................. 7-335414

[51] Int. Cl.$^7$ ....................................................... H04N 1/21
[52] U.S. Cl. ........................... 358/403; 358/435; 358/438
[58] Field of Search .................................. 358/434, 435, 358/436, 444, 468, 407, 462, 464, 442, 440, 403; H04N 1/32, 1/21

[56] References Cited

U.S. PATENT DOCUMENTS

| | | | |
|---|---|---|---|
| 5,414,528 | 5/1995 | Hatamura ................................. | 358/440 |
| 5,528,383 | 6/1996 | Tezuka et al. ........................... | 358/442 |
| 5,583,655 | 12/1996 | Tsukamoto et al. ..................... | 358/403 |
| 5,677,773 | 10/1997 | Sakayama et al. ....................... | 358/403 |
| 5,680,224 | 10/1997 | Nakamura et al. ...................... | 358/407 |
| 5,719,686 | 2/1998 | Sakamoto et al. ....................... | 358/444 |

OTHER PUBLICATIONS

International Telecommunication Union, CCITT, "Binary File Transfer Format For The Telematic Services", Recommendation T.434, Sep. 1992, pp. 1–10.

International Telecommunications Union, ITU–T "Procedures For Document Facsimile Transmission In The General Switched Telephone Network", Draft Revision 3.F, Recommendation T.30, Jun. 1996, pp. 1–166.

Primary Examiner—Kim Yen Vu
Attorney, Agent, or Firm—Cooper & Dunham LLP

[57] ABSTRACT

A facsimile apparatus and method transmits various file data to a destination facsimile apparatus and includes a first transmit device for transmitting document file data or program file data to the destination facsimile apparatus. A second transmit device forms file data which includes side information related to all of the document file data or the program file data, and transmits the file data in advance of the transmission of the document file data or the program file data. The side information of the file data can include translate data for indicating to the destination facsimile apparatus to translate and transmit the document file data or the program file data to another facsimile apparatus. The side information of the file data can include format data related to the document file data or the program file data. In addition, the side information of the file data can be after adjustment data regarding the document file data or the program file data. The facsimile apparatus may recognize whether or not the destination facsimile apparatus has an ability for executing the after adjustment of the transmitted file data, and to disconnect the telephone line if the destination facsimile apparatus does not have the ability. Accordingly, the facsimile apparatus need not continue to transmit the file data uselessly.

12 Claims, 8 Drawing Sheets

FIG. 3
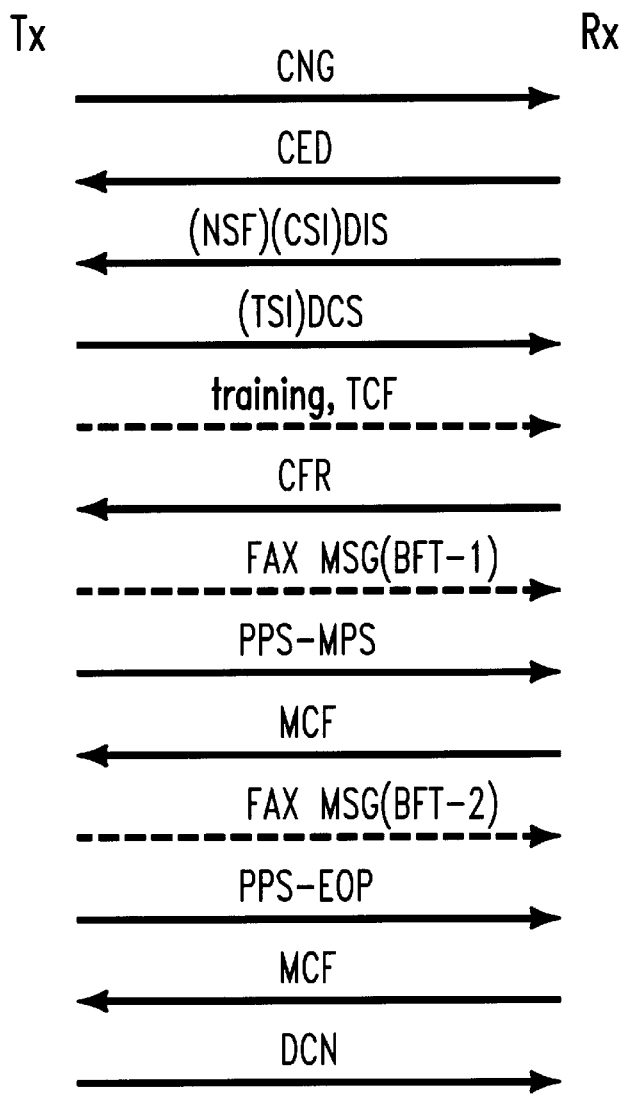
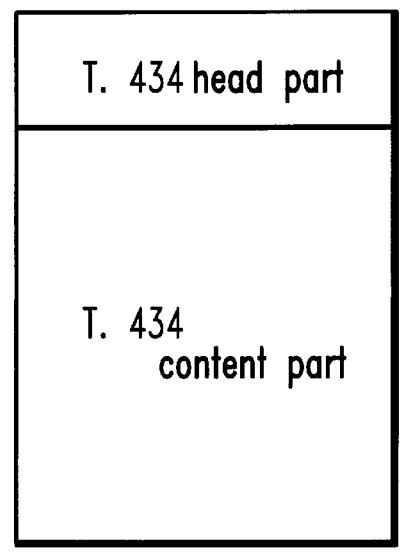
FIG. 5

TABLE 1/T.434

File attributes

| Attribute Name |
| --- |
| protocol version |
| filename |
| permitted actions |
| contents type |
| storage account |
| date and time of creation |
| date and time of last modification |
| date and time of last read access |
| identity of creator |
| identity of last modifier |
| identity of last reader |
| filesize |
| future filesize |
| access control |
| legal qualifications |
| private use |
| structure |
| application reference |
| machine |
| operating system |
| recipient |
| character set |
| compression |
| environment |
| pathname |
| user visible string |
| data file content |

FIG. 4

FIG. 8
FIG. 9
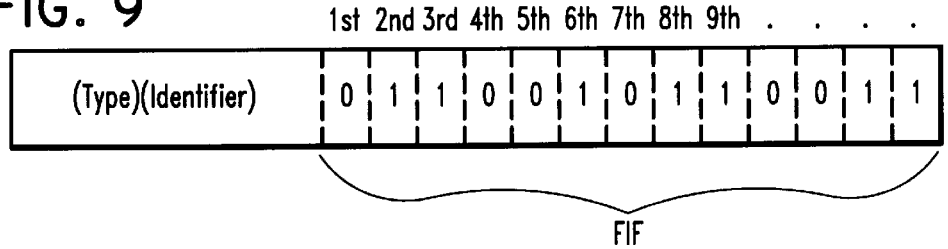
FIG. 10
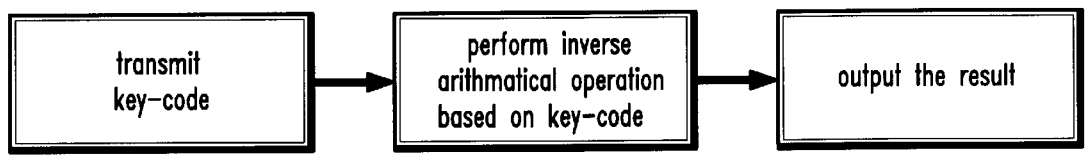
FIG. 11
| number of translation : 6 | | |
|---|---|---|
| 03-111-2222 | 03-222-3333 | 012-345-6789 |
| 012-345-7890 | 0123-45-0000 | 0123-00-3333 |

| |
|---|
| open the transmitted binary file data |
| store (copy) the transmitted binary file data onto the hard disk |
| store (copy) the transmitted binary file data onto a floppy disk and a hard disk |
| store (copy) the transmitted binary file data onto a hard disk and delete from memory |

FIG. 12

| | |
|---|---|
| page 1 | binary file data |
| page 2 | MMR |
| page 3 | MMR |
| page 4 | JPEG |

FIG. 13

FACSIMILE APPARATUS FOR TRANSMITTING A BINARY FILE DATA

BACKGROUND OF THE INVENTION

1. Field of the Invention

The present invention relates to a facsimile apparatus and method which can transmit various types of file data to a destination facsimile apparatus through a telephone line.

2. Description of the Related Art

A Binary File Transfer (BFT) function standard of the ITU-T (International Telecommunication Union—Telecommunication Standardization Sector) for facsimile apparatuses which are connected to personal computers, includes a file transfer function for transmitting various types of file data to a destination facsimile apparatus.

However, the communication protocol of conventional facsimile apparatuses is not sufficient to perform this procedure, so that instances occur where the destination facsimile apparatus may not recognize the data form of the transmitted file data completely and must therefore perform an adjustment on the transmitted file data.

In addition, the transmitting facsimile apparatus may not be capable of recognizing whether or not the receiving facsimile apparatus has the ability to perform such adjustment of the transmitted file data. Accordingly, the transmitting facsimile apparatus may continue to transmit the file data uselessly even if the receiving facsimile apparatus does not have the ability for performing such adjustment on the file data.

SUMMARY OF THE INVENTION

The present invention solves the problem of the previously described conventional facsimile apparatuses. Thus, an object of the invention is to provide a facsimile apparatus or a facsimile communication procedure (protocol) which can recognize whether or not the receiving facsimile apparatus has an ability to deal with prearranged transmission file data.

In order to achieve the object of the present invention, a facsimile apparatus which transmits various file data to a destination facsimile apparatus includes a first transmit device that transmits document file data or program file data to the destination facsimile apparatus. A second transmit device forms file data which includes side information related to all of the document file data or the program file data, and transmits the file data in advance of the transmission of the document file data or the program file data.

The facsimile apparatus can further include a confirmation device that analyzes a data signal which is transmitted from the destination facsimile apparatus in response to the file data and confirms an ability of the destination facsimile apparatus to deal with the document file data or program file data based on the analysis.

The side information of the file data can include data for indicating to the destination facsimile apparatus to translate and transfer the document file data or the program file data to one or more other facsimile apparatuses.

Furthermore, the side information of the file data can include form data indicating the form of the document file data or the program file data.

In addition, the side information of the file data can include after adjustment data regarding the document file data or the program file data.

According to the present invention, the facsimile apparatus can recognize whether or not the destination facsimile apparatus has an ability to perform an after adjustment of the transmitted file data during the data communication, and can disconnect the telephone line if the destination facsimile apparatus does not have the ability. Accordingly, the facsimile apparatus need not continue to transmit the file data uselessly.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a flowchart showing a facsimile communication procedure in an error correction mode (ECM) of ITU-T Recommendation T.30;

FIGS. 4 and 5 are illustrations showing a data table form of file attributes of ITU-T Recommendation T.434;

FIG. 8 is an illustration showing a bit form of a HDLC of ITU-T Recommendation;

FIG. 9 is an illustration showing a bit form of a FIF of the HDLC in the present invention;

FIG. 10 is a flowchart showing a procedure for performing an arithmetical operation in order to compress original binary file data in the present invention;

FIG. 11 is an illustration showing translation information in the present invention;

FIG. 12 is an illustration showing after adjustment information related to the binary file data in the present invention; and FIG. 13 is an illustration showing data form information about the binary file data in the present invention.

DETAILED DESCRIPTION OF THE PREFERRED EMBODIMENTS

With reference to the accompanying figures, the preferred embodiments of the present invention will now be described.

Figure 1:
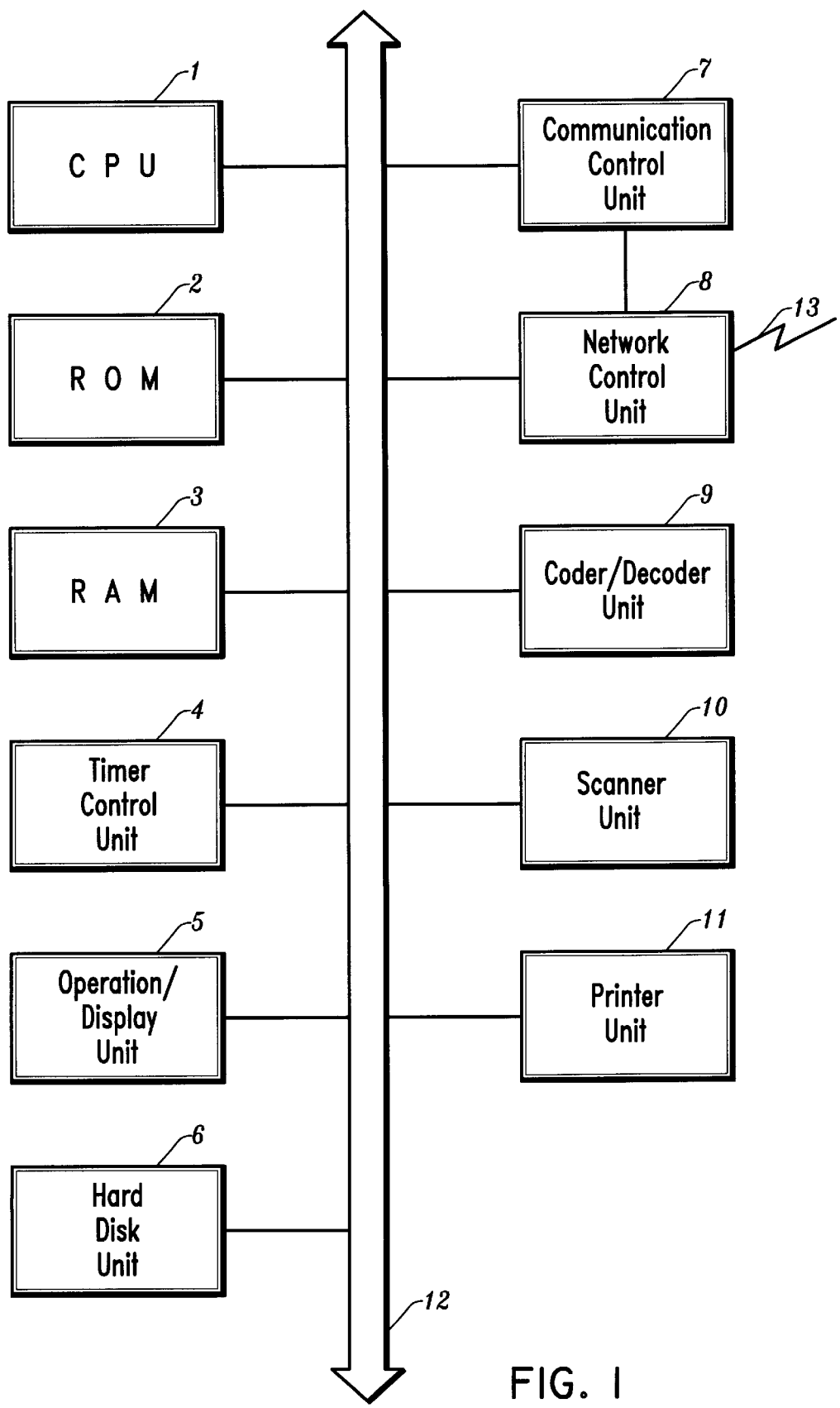
FIG. 1 is a schematic block diagram illustrating an exemplary structure of a facsimile apparatus which can implement the feature of the present invention.

FIG. 1 shows a schematic block diagram of a facsimile apparatus according to embodiments of the present invention.

The facsimile apparatus comprises a CPU (Central Processing Unit) 1, a ROM (Read Only Memory) 2, a RAM (Random Access Memory) 3, a timer control unit 4, an operation/display unit 5, a hard disk unit 6, a communication control unit 7, a network control unit 8, a coder/decoder unit 9, a scanner unit 10, and a printer unit 11. Data transmission between these components is mainly performed via internal bus 12.

CPU 1 performs control processing for controlling each of the components of the facsimile apparatus.

ROM 2 stores process programs which are executed by CPU 1 and various sets of data necessary for executing the process programs.

RAM 3 stores various sets of information specific to the facsimile apparatus, and also provides a work area for CPU 1.

The timer control unit 4 manages time data used by the facsimile apparatus to control an interruption procedure.

Operation/display unit 5 comprises an operation board and an operation interface. The operation board has various keys, for example, for inputting a telephone number of a destination facsimile apparatus and various types of operational information. The operation interface performs various processes input by the operation board.

Hard disk unit 6 includes a hard disk drive and a drive interface. The hard disk drive writes/rewrites various file data (program file data, document file data, etc.) onto a hard disk. The drive interface performs processes for controlling the hard disk drive.

Communication control unit 7 performs a predetermined procedure in accordance with a G3 facsimile communication protocol (ITU-T.30 recommendation) based on a controlling command from CPU 1. Network control unit 8 connects to a telephone line 13 and provides an interface between a facsimile apparatus and a telephone network.

Coder/decoder unit 9 compresses image data using a Modified Huffman code, a Modified READ code or a Modified Modified READ code, and decompresses compressed image data by decoding to generate the original image data.

Scanner unit 10 includes a scanner device and a scanner interface. The scanner device reads an original document image at a predetermined resolution, and the scanner interface performs a process for controlling transmission of the read data.

Printer unit 11 includes a printer device and a printer interface. The printer device outputs an image on a sheet of paper at a predetermined resolution using an ink-jet print device or a laser print device, for example, and the printer interface performs a process for controlling transmission of the image data to the printer device.

Figure 2:
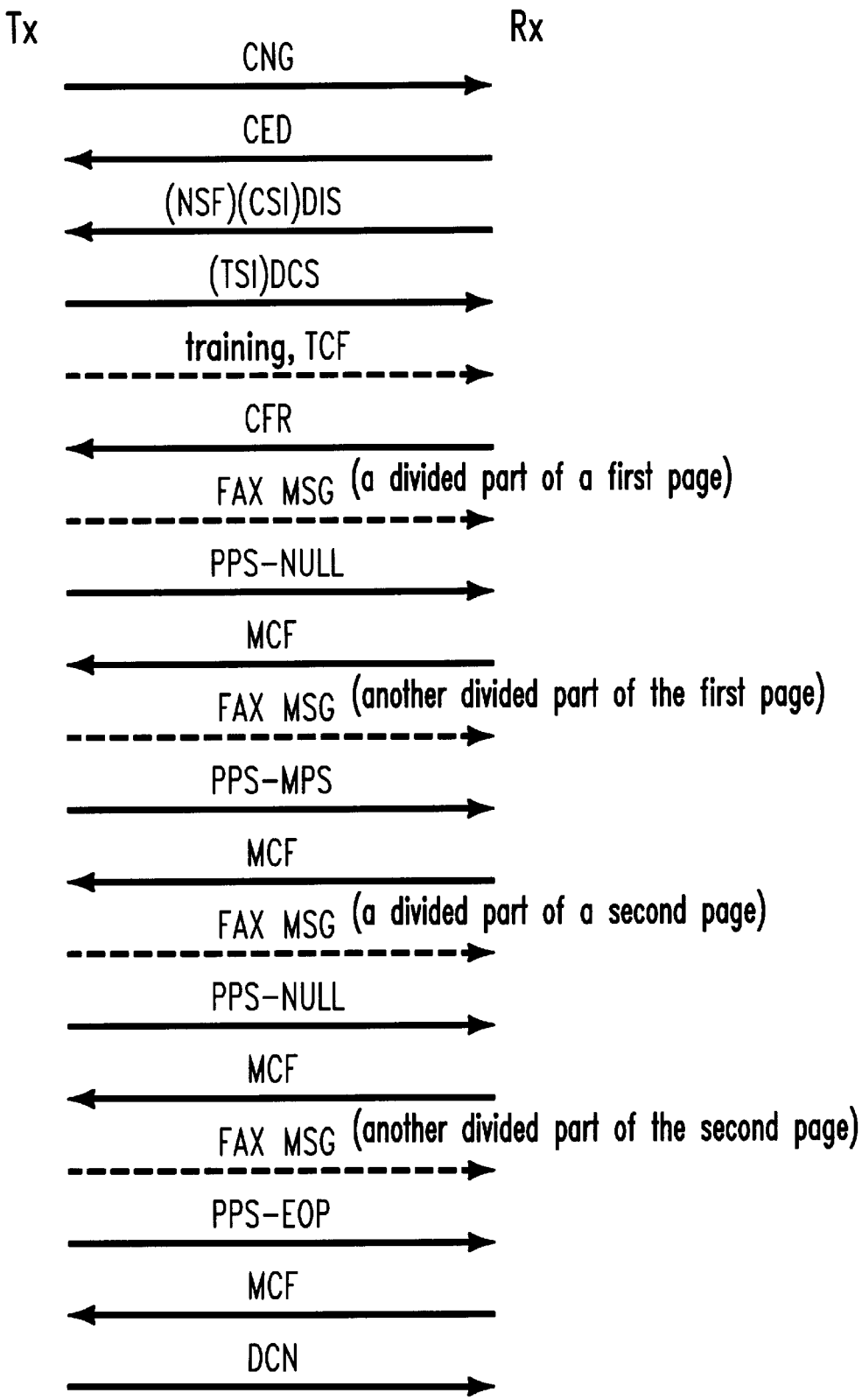
FIG. 2 is a flowchart showing a facsimile communication procedure of ITU-T Recommendation T.30.

FIG. 2 is an illustration for explaining a G3 facsimile communication procedure including an error correction mode (ECM mode/ITU-T Recommendation T.30).

A transmitting facsimile apparatus (Tx) transmits a CNG (Calling Tone) signal to a receiving facsimile apparatus (RX).

The receiving facsimile apparatus transmits a CED (Called Station Identification) signal, and a NSF. (Non Standard Facilities) signal, a CSI (Called Station Identification) signal and a DIS (Digital Identification Signal) to the transmitting facsimile apparatus in response to the CNG signal.

The transmitting facsimile apparatus transmits a TSI (Transmitting Subscriber Identification) signal and a DCS (Digital Command Signal) to the receiving facsimile apparatus.

The transmitting facsimile apparatus and the receiving facsimile apparatus then perform a communication training procedure using a TCF (Training Check Field) signal and a CFR (Confirmation to Receive) signal.

After the communication training, the transmitting facsimile apparatus transmits a FAXMSG (Facsimile Message) which is compressed and coded image data of a divided portion of a first page of the document being transmitted, and a PPS-NULL (Partial Page Signal—NULL) signal to the receiving facsimile apparatus. The PPS-NULL signal indicates a boundary between the divided portions of the page.

The receiving facsimile apparatus transmits a MCF (Message Confirmation) signal to the transmitting facsimile apparatus in response to the PPS-NULL signal.

The transmitting facsimile apparatus then transmits the FAXMSG which is compressed and coded image data of another divided portion of the first page, and a PPS-MPS (Partial Page Signal—Multi Page Signal) signal to the receiving facsimile apparatus. The PPS-MPS signal indicates a boundary between each of the pages being transmitted.

The receiving facsimile apparatus transmits an MCF signal in response to the PPS-NULL signal.

The transmitting facsimile apparatus then transmits the FAXMSG which is compressed and coded image data of a divided portion of a second page of the document being transmitted and a PPS-NULL signal to the receiving facsimile apparatus.

The receiving facsimile apparatus transmits an MCF signal in response to the PPS-NULL signal.

The transmitting facsimile apparatus then transmits the FAXMSG which is compressed and coded image data of another divided portion of the second page, and a PPS-EOP (Partial Page Signal—End Of Page) signal to the receiving facsimile apparatus. The PPS-EOP signal indicates that the transmitting facsimile apparatus has no more image data to send.

The receiving facsimile apparatus transmits an MCF signal in response to the PPS-EOP signal.

The transmitting facsimile apparatus then transmits a DCN (Disconnect) signal to the receiving facsimile apparatus.

Accordingly, the pages of image data can be transmitted from the transmitting facsimile apparatus to the receiving facsimile apparatus.

FIG. 3 is an illustration for explaining a procedure for performing a G3 facsimile communication procedure according to a BFT function mode.

A transmitting facsimile apparatus transmits a CNG signal to a receiving facsimile apparatus.

The receiving facsimile apparatus transmits a CED signal, and a NSF signal, a CSI signal and a DIS signal to the transmitting facsimile apparatus in response to the CNG signal. In this case, the receiving facsimile apparatus informs the transmitting facsimile apparatus that the receiving facsimile apparatus has a BFT function by controlling the appropriate bit in the DIS signal.

The transmitting facsimile apparatus transmits a TSI signal which indicates to the receiving facsimile apparatus to set a BFT function mode.

The transmitting facsimile apparatus and the receiving facsimile apparatus then perform a communication training procedure using a TCF signal and a CFR signal.

After the communication training procedure, the transmitting facsimile apparatus transmits a FAXMSG (BFT-1) which is compressed and coded binary file data of a first page of a document to be transmitted, and a PPS-MPS signal to the receiving facsimile apparatus. The PPS-MPS signal indicates a boundary between each of the pages being transmitted.

The receiving facsimile apparatus transmits an MCF signal in response to the PPS-MPS signal.

The transmitting facsimile apparatus then transmits a FAXMSG (BFT-2) which is compressed and coded binary file data of a second page of the document being transmitted, and a PPS-EOP signal to the receiving facsimile apparatus. The PPS-EOP signal indicates that the transmitting facsimile apparatus has no more data to be transmitted. The receiving facsimile apparatus then transmits an MCF signal in response to the PPS-EOP signal.

The transmitting facsimile apparatus then transmits a DCN signal to the receiving facsimile apparatus.

Using such a procedure, the binary file data can be efficiently transmitted from the transmitting facsimile apparatus to the receiving facsimile apparatus.

FIG. 4 illustrates a table listing the BFT file attributes according to ITU-T Recommendation T.434.

According to an embodiment of the present invention, the transmitter facsimile apparatus sets some side information regarding the file contents in the "private use" portion of the file attributes, and transmits the side information to check on the abilities of the receiving facsimile apparatus.

FIG. 5 illustrates a data format sample for setting the BFT file attributes in the FAXMSG. A T.434 header part consists of the data of the BFT file attributes without the data file content (the binary file data), and a T.434 content part which consists of the binary file data itself.

Figure 6:
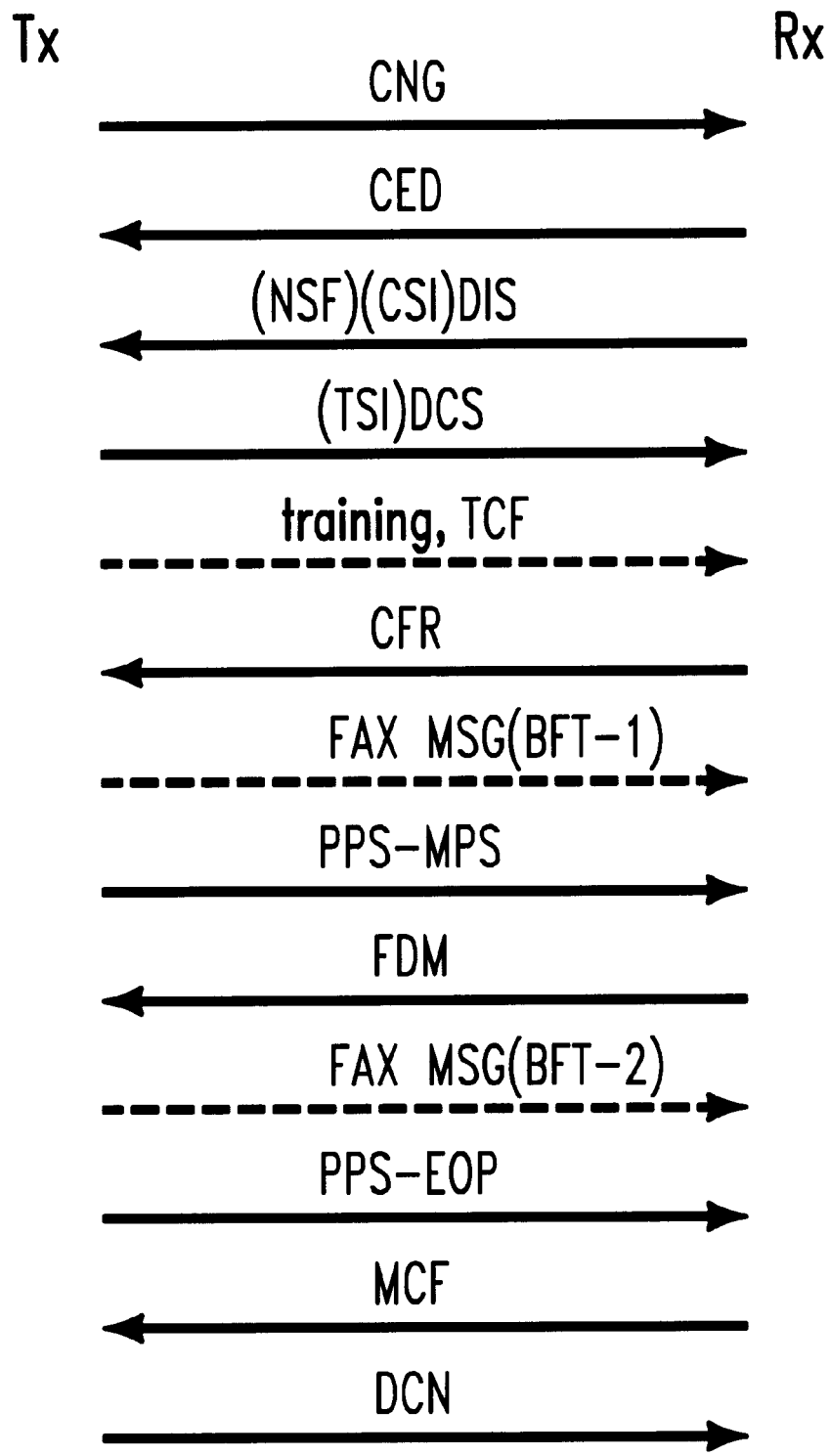
FIG. 6 is a flowchart showing a facsimile communication procedure in the present invention.
Figure 7:
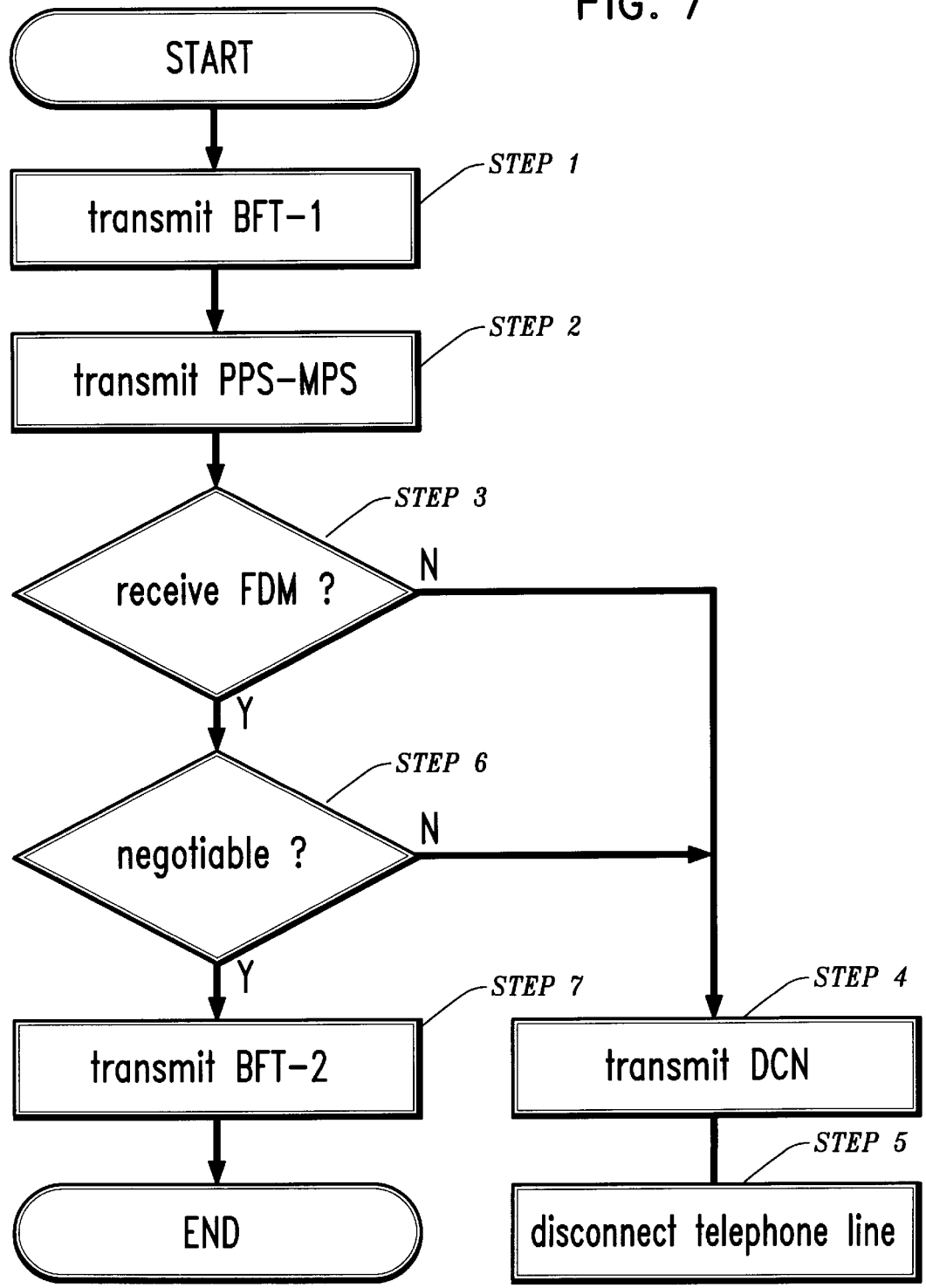
FIG. 7 is a flowchart showing a procedure for confirming the abilities of the destination facsimile apparatus in the present invention.

FIG. 6 and FIG. 7 are illustrations for explaining a communication procedure utilizing the BFT function mode according to an embodiment of the present invention.

A transmitting facsimile apparatus transmits the CNG signal to a receiving facsimile apparatus.

The receiving facsimile apparatus transmits a CED signal, and a NSF signal, a CSI signal and a DIS signal to the transmitting facsimile apparatus in response to the CNG signal. The receiving facsimile apparatus may inform the transmitting facsimile apparatus that the receiving facsimile apparatus has a BFT function mode by controlling the appropriate bit in the DIS signal.

The transmitting facsimile apparatus transmits a TSI signal which indicates to the receiving facsimile apparatus to set the BFT function mode, if the transmitting facsimile apparatus receives the DIS signal which indicates that the receiving facsimile apparatus has the BFT function mode.

The transmitting facsimile apparatus and the receiving facsimile apparatus then perform a communication training procedure using a TCF signal and a CFR signal.

After the communication training procedure, the transmitting facsimile apparatus transmits a FAXMSG (BFT-1) which consists of the T.434 header part and a PPS-MPS signal to the receiving facsimile apparatus (steps 1 and 2 in FIG. 7). In this case, the "private use" section of the BFT file attributes is set to include side information (e.g., translation information, file content information, after adjustment information, etc ).

The receiving facsimile apparatus then transmits a FDM (File Diagnostics Message/ITU-T Recommendation T.30) to the transmitting facsimile, when the receiving facsimile apparatus analyzes and recognizes the binary file data of the FAXMSG (BFT-1). In the event that the receiving facsimile apparatus is not able to recognize the binary file data of the FAXMSG (BFT-1), the receiving facsimile apparatus transmits a PPR (Partial Page Request) signal to the transmitting facsimile apparatus.

If the FDM signal is not transmitted from the receiving facsimile apparatus within a predetermined period of time, the transmitting facsimile gives up trying to perform the data communication and transmits the DCN signal to the receiving facsimile apparatus and disconnects the telephone line (steps 4 and 5).

If the FDM signal is received, the transmitting facsimile apparatus checks whether or not the receiving facsimile apparatus is negotiable for data communication (step 6). If the receiving-facsimile apparatus is not negotiable for data communication, the transmitting facsimile apparatus gives up trying to continue the communication and transmits the DCN signal to the receiving facsimile apparatus for disconnecting the telephone line (steps 4 and 5).

If the receiving facsimile apparatus is negotiable, the transmitting facsimile apparatus then transmits the T.434 content part (e.g., the compressed and coded binary file data of the first page).

The transmitting facsimile apparatus then transmits the FAXMSG (BFT-2) which is compressed and coded binary file data of the second page (step 7), and a PPS-EOP signal to the receiving facsimile apparatus. The PPS-EOP signal indicates that the transmitting facsimile apparatus has no more data to transmit.

The receiving facsimile apparatus transmits the MCF signal in response to the PPS-EOP signal.

The transmitting facsimile apparatus then transmits the DCN signal to the receiving facsimile apparatus.

Accordingly, the binary file data can be efficiently transmitted from the transmitting facsimile apparatus to the receiving facsimile apparatus.

After communication with the transmitting facsimile apparatus, the receiving facsimile apparatus performs a translation procedure, an after adjustment procedure, or a management file procedure based on the side information, as described below.

FIG. 11 is an illustration for explaining the translation information according to the first embodiment of the present invention.

In this case, the translation information includes the numbers of translations (6 in this case) and six telephone numbers (03-111-2222, 03-222-3333, 012-345-6789, 012-345-7890, 0123-45-0000, 0123-00-3333) for translation. The translation information is transmitted to the receiving facsimile apparatus.

The receiving facsimile apparatus translates and transmits the binary file data of the FAXMSG (BFT-2.3.4 . . . ) to the six distination facsimile apparatuses based on the translation information in the FAXMSG (BFT-1), when the receiving facsimile apparatus receives the FAXMSG (BFT-1) and the FAXMSG (BFT-2,3,4 . . . ).

Accordingly, the transmitting facsimile apparatus may indicate to the receiving facsimile apparatus to translate and transmit the binary file data with the FAXMSG (BFT-1), whenever the receiver facsimile apparatus analyzes and recognizes the binary file data of the FAXMSG (BFT-1).

FIG. 12 is an illustration of the various types of after adjustment information according to the first embodiment of the present invention.

In this case, the transmitting facsimile apparatus selects one of the various types of after adjustment information (e.g., open the transmitted binary file data, store (copy) the transmitted binary file data onto the,hard disk, store (copy) the transmitted binary file data onto a floppy disk and the hard disk, store (copy) the transmitted binary file data onto the hard disk and delete the stored data from memory, etc.) and sets the selected information in the side information in accordance with an indication from the user of the transmitting facsimile apparatus.

When the receiving facsimile apparatus recognizes that the "store (copy) the transmitted binary file data onto the floppy disk and delete the binary file data from memory" is set in the side information as after adjustment information, the receiving facsimile apparatus checks whether or not a floppy disk is present in the receiving facsimile apparatus.

The receiving facsimile apparatus receives the binary file data FAXMSG (BFT-2,3,4 . . . ) and stores the binary file data in a RAM 3 (FIG. 1) until the facsimile communication is complete.

The receiving facsimile apparatus then copies the transmitted binary file data (BFT-2,3,4 . . . ) from RAM 3 onto the floppy disk and deletes the binary file data which has been copied onto the floppy disk from the RAM 3, if the floppy disk is present in the receiving facsimile apparatus.

FIG. 13 is an illustration for explaining the file content information according to an embodiment of the present invention.

The file content information indicates the data form, the species of the editor (e.g., the type of word-processor), J-PEG, J-PIG, or bit-map format, etc.

In this case, for example, the file content information is set to indicate to the receiving facsimile apparatus that "a data form of a file data of the first page is binary form, the data form of the file data of the second page and third page are bit-map form, and a data form of the data of the fourth page is J-PEG (Joint Photographic Experts Group) form". The transmitting facsimile apparatus transmits the file content information as part of the FAXMSG (BFT-1).

The receiving facsimile apparatus receives binary file data (BFT-1,2,3,4 . . . ), and then performs a procedure to manage the transmitted binary file data (BFT-2,3,4 . . . ) based on the file content information in each file.

FIG. 8 is an illustration for explaining the format of the HDLC (High Data Link Control) frame according to the ITU-T Recommendation T.30.

The HDLC frame consists of a flag sequence (F), an address field (A), a control field (C), a facsimile control field (FCF), a facsimile information field (FIF), a frame checking sequence (FCS), and a flag sequence (F).

According to an embodiment of the present invention, the FIF can be provided in the FDM signal which is transmitted from the receiving facsimile apparatus.

FIG. 9 is an illustration for explaining the format of the FIF which can be provided in the FDM signal.

There are thirteen bits of information which can be controlled to indicate the abilities that can be performed by the receiving facsimile apparatus.

In this case, the first and second bits of the FIF are for indicating the ability of the receiving facsimile apparatus to deal with the data form of binary file data. The third bit of the FIF is for indicating an ability to perform a translation function in response to a request from the transmitting facsimile apparatus with the FAXMSG (BFT-1). The fourth bit of the FIF is for indicating the ability of the receiving facsimile apparatus to perform after adjustment on the transmitted data. The fifth bit is for indicating the ability of the receiving facsimile apparatus to perform a particular data communication function. Bits 6–13 can be controlled to indicate various other abilities that can be performed by the receiving facsimile apparatus.

FIG. 10 is an illustration for explaining a particular data communication procedure according to an embodiment of the present invention.

In this mode, the transmitting facsimile apparatus compresses the original data using a predetermined arithmetical operation and a key-code, and the receiving facsimile apparatus receives the key-code in the essential information provided by the FAXMSG (BFT-1). The receiving facsimile apparatus decompresses the compressed data by performing a predetermined arithmetical inverse operation based on the received key-code and outputs the results. This reduces the quantity of transmission data and consequently reduces the communication time necessary for transmitting the data.

In addition, the side information can be set in the T.434 content part instead of in the T.434 header part as a part of a functional list, for example. In this case, the FAXMSG (BFT-1) is not only set in the T.434 header part, but also in the T.434 content part (including the side information) and is transmitted to the receiver facsimile apparatus.

While exemplary preferred embodiments of the invention have been described and illustrated in connection with the drawings, the invention is not limited as described or illustrated but is only limited by the scope of the appended claims.

What is claimed is:

1. A facsimile apparatus which transmits various types of file data to a destination facsimile apparatus, said facsimile apparatus comprising:

a first transmit device for transmitting a plurality of pages of document file data or program file data having different data forms to the destination facsimile apparatus;

a second transmit device for forming binary file data which includes side information related to each of the pages of the document file data or the program file data, indicating the data form for each of the plurality of pages and transmitting the binary file data in advance of the transmission of the plurality of pages of the document file data or the program file data, wherein the destination facsimile apparatus performs storage and other procedures based on the side information; and a confirm device for confirming the ability of said destination facsimile apparatus to deal with the data form of each of the pages of the document file data or program file data described in said binary file data, where said transmitting facsimile apparatus will not transmit the document file data or the program file data if the destination facsimile apparatus is unable to deal with the data form of each of the pages of the document file data or program file data.

2. The facsimile apparatus according to claim 1, wherein the confirm device for confirming an ability of the destination facsimile apparatus to deal with the data form of each of the pages of the document file data or program file data is based on an analysis of a data signal sent by the destination facsimile apparatus in response to the binary file data.

3. The facsimile apparatus according to claim 2, wherein the side information of the file data includes after adjustment data regarding the document file data or the program file data for indicating to the destination facsimile apparatus to perform storage procedures.

4. The facsimile apparatus according to claim 2, wherein the side information of the file data includes translate data for indicating to the destination facsimile apparatus to perform a translation procedure by translating and transferring the document file data or the program file data to another facsimile apparatus.

5. The facsimile apparatus according to claim 1, wherein the side information of the file data includes translate data for indicating to the destination facsimile apparatus to perform a translation procedure by translating and transferring the document file data or the program file data to another facsimile apparatus.

6. The facsimile apparatus according to claim 1, wherein the side information of the file data includes after adjustment data regarding the document file data or the program file data for indicating to the destination facsimile apparatus to perform storage procedures.

7. A facsimile transmission method for transmitting various types of file data to a destination facsimile apparatus, said method comprising steps of:

transmitting a plurality of pages of document file data or program file data having different data forms to the destination facsimile apparatus;

forming binary file data which includes side information related to each of the pages of the document file data or the program file data, indicating the data form for each of the plurality of pages;

transmitting the file data in advance of the transmission of the document file data or the program file data, wherein the destination facsimile apparatus performs storage and other procedures based on the side information;

confirming the ability of said destination facsimile apparatus to deal with the data form of each of the pages of the document file data or program file data described in said binary file data; and transmitting said document file data or said program file data only when said destination facsimile apparatus is able to deal with the data form of each of the pages of the document file data or the program file data.

8. The method according to claim 7, wherein the step of confirming the ability of said destination facsimile apparatus to deal with the data form of each of the pages of the document file data or program file data described in said binary file data further comprises the step of analyzing a data signal which is transmitted from the destination facsimile apparatus in response to the binary file data.

9. The method according to claim 8, wherein the side information of the file data includes translate data for indicating to the destination facsimile apparatus to perform a translation procedure by translating and transferring the document file data or the program file data to another facsimile apparatus.

10. The method according to claim 8, wherein the side information of the file data includes after adjustment data regarding the document file data or the program file data for indicating to the destination facsimile apparatus to perform storage procedures.

11. The method according to claim 7, wherein the side information of the file data includes translate data for indicating to the destination facsimile apparatus to perform a translation procedure by translating and transferring the document file data or the program file data to another facsimile apparatus.

12. The method according to claim 7, wherein the side information of the file data includes after adjustment data regarding the document file data or the program file data for indicating to the destination facsimile apparatus to perform storage procedures.

* * * * *